(12) United States Patent
Casset

(10) Patent No.: US 11,592,904 B2
(45) Date of Patent: Feb. 28, 2023

(54) FLEXIBLE HAPTIC INTERFACE

(71) Applicant: COMMISSARIAT A L'ENERGIE ATOMIQUE ET AUX ENERGIES ALTERNATIVES, Paris (FR)

(72) Inventor: Fabrice Casset, Grenoble (FR)

(73) Assignee: COMMISSARIAT Á L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/694,874

(22) Filed: Mar. 15, 2022

(65) Prior Publication Data

US 2022/0300076 A1 Sep. 22, 2022

(30) Foreign Application Priority Data

Mar. 16, 2021 (FR) ...................................... 2102601

(51) Int. Cl.
  *G06F 3/01* (2006.01)
  *G06F 3/041* (2006.01)
(52) U.S. Cl.
  CPC .............. *G06F 3/016* (2013.01); *G06F 3/041* (2013.01); *G06F 2203/04102* (2013.01)
(58) Field of Classification Search
  None
  See application file for complete search history.

(56) References Cited

U.S. PATENT DOCUMENTS

| 2009/0250267 A1* | 10/2009 | Heubel ............... G06F 3/04886 178/18.03 |
| 2011/0279374 A1 | 11/2011 | Park et al. |
| 2014/0160063 A1* | 6/2014 | Yairi ................... G06F 3/04886 345/173 |
| 2016/0077662 A1* | 3/2016 | Ciesla ................... G06F 1/1664 345/173 |
| 2017/0002290 A1 | 1/2017 | Siemianowski et al. |
| 2020/0298488 A1 | 9/2020 | Eisaman et al. |

FOREIGN PATENT DOCUMENTS

WO 2010/078597 A1 7/2010

OTHER PUBLICATIONS

Löchtefeld, Markus, "Towards Real Organic User Interfaces—Using Non-Newtonian Fluids for Self-Actuated Displays," ACM International Conference on Human Factors in Computing Systems (CHI-13) ACM 2013.

(Continued)

*Primary Examiner* — Krishna P Neupane
(74) *Attorney, Agent, or Firm* — Oliff PLC

(57) ABSTRACT

Flexible haptic interface including a chamber containing a non-newtonian fluid and bounded at least partially by a flexible wall the exterior face of which defines a touch surface capable of being touched by a user; a plurality of actuators borne by a flexible carrier and placed so as to transmit a local mechanical excitation to the fluid; and a control circuit connected to the actuators and configured to modulate the signals sent to the actuators in order to mechanically induce a modification of the rheology of the fluid and to generate a haptic sensation perceptible by the user on the touch surface.

19 Claims, 13 Drawing Sheets

(56) References Cited

OTHER PUBLICATIONS

Casset F et al. "Piezoelectric Membrane Actuator Design," Thermal, Mechanical and Multi-Physics Simulation and Experiments in Micro-electronics and Microsystems (Eurosime), 2011 12th International Converence On, IEE, Apr. 18, 2011.
Poncet, Pauline et al. "Static and Dynamic Studies of Electro-Active Polymer Actuators and Integration in a Demonstrator" Actuators, pp. 1-10, May 4, 2017.
Nov. 25, 2021 Search Report issued in French Patent Application No. 2102601.

* cited by examiner

FLEXIBLE HAPTIC INTERFACE

TECHNICAL FIELD

The present invention relates to human-machine interfaces, and made more particularly those producing haptic effects.

PRIOR ART

A haptic interface allows the user to interact with his environment via his sense of touch. At the present time, haptic effects are increasingly being used in many applications, for example in smartphones, the latter now generating a slight vibration when a key displayed on the display is pressed in order to simulate the impression of pressing on a button. Haptic applications also exist in virtual- or augmented-reality devices, in particular in order to allow a better immersion in video games. Haptic interfaces such as touch panels, which generate a haptic effect on a touch surface when a user touches it, may especially be integrated into many technologies such as desktop or laptop computers, tablet computers and/or smartphones.

It is known to generate a variety of relatively complex haptic effects on a stiff touch surface by virtue of ultrasonic transducers that emit ultrasonic waves that propagate over the stiff surface.

With the appearance on the market of Flexible commercial products, such as foldable smartphones or even rollable television sets, it would be desirable to provide flexible haptic interfaces able to be integrated into such products.

The article by Poncet et. al. "Static and dynamic studies of electro-active polymer actuators and integration in a demonstrator" (Actuators Journal, 2017) describes a device comprising piezoelectric actuators mounted on a flexible substrate allowing vibrotactile buttons to be obtained. However, to obtain the desired haptic effect, the substrate must be borne by a rigid structure, this substantially limiting the flexible nature of the product.

It is moreover known to use fluids to generate a haptic effect. Patent application WO2010078597A1 discloses a haptic touch interface comprising fluidic chambers and channels allowing a key-click effect to be generated.

The article by Lochtefeld "Towards real organic user interfaces—using non-Newtonian fluids for self-actuated displays" (CHI3 workshop, 2013) describes a haptic device using a shear-thickening non-newtonian fluid sandwiched between two flexible sheets placed on a fixed array of loudspeakers. A topology perceptible with the finger is generated when a sound wave propagates through the fluid and hardens it locally. The spatial resolution of the generated haptic effect is however relatively low on account of the hulk of the loudspeakers and in addition such an interface is not completely flexible.

DISCLOSURE OF THE INVENTION

There is therefore a need to further improve flexible haptic interfaces, especially in order to provide a touch interface that is relatively simple to produce and that is able to generate a variety of haptic effects.

SUMMARY OF THE INVENTION

The invention aims to meet this need, and it does so, according to a first of its aspects, by virtue of a flexible haptic interface comprising:

- a chamber containing a non-newtonian fluid and bounded at least partially by a flexible wall the exterior face of which defines a touch surface capable of being touched by a user,
- a plurality of actuators borne by a flexible carrier and placed so as to transmit a local mechanical excitation to the fluid, and
- a control circuit connected to the actuators and configured to modulate the signals sent to the actuators in order to mechanically induce a modification of the rheology of the fluid and to generate a haptic sensation perceptible by the user on the touch surface.

By "non-newtonian fluid", what is meant is a fluid the viscosity of which is not constant and depends on the mechanical stresses to which it is subjected. Thus, under the vibratory action of the actuators, the viscosity of the fluid undergoes local variations depending on the properties of the fluid: it will appear relatively "viscous", or relatively "stiff", when it is moved, for example. A shear-thickening fluid, for example, will see its viscosity increase in response to a mechanical action. Conversely, a shear-thinning fluid will see its viscosity decrease in response to a mechanical action.

The invention allows a variety of haptic effects to be obtained on a flexible surface using a fluid the viscosity variations of which induced by the actuators are marked enough to be perceived tactilely by the user, and especially by the finger of the user touching the touch surface of the interface, especially when it is moved while touching the interface. Such an effect cannot be obtained with newtonian fluids such as pure water, the viscosity or "stiffness" of which remains constant whatever the action thereon.

Depending on the number of actuators in operation, it is possible to create the impression of complex stiff shapes. In addition, by varying the amplitude of the action on the non-newtonian fluid, the viscosity variation may be increased or decreased, this allowing the complexity of the generated haptic effect to be increased, and the user to thereby be given the impression of touching a surface having various degrees of hardness.

The touch of the user on the touch surface may be a direct touch of the skin on the surface or an indirect touch through one or more intermediate media, nevertheless allowing a tactile stimulus to be felt, for example one or more layers of clothing or a glove. The touch may be with the finger or with another region of the body.

Chamber

The chamber preferably has a flat general shape. It may especially have a parallelepipedal shape when the interlace is flat, this allowing a tablet-type interface to be obtained if so desired.

The chamber preferably has a substantially constant thickness, possibly ranging from a few hundred μm to a few mm.

The chamber may be produced in a number of ways. The chamber is for example formed between at least two opposite flexible walls, one at least of which walls defines the touch surface, and especially walls comprising or defined by flexible sheets. The chamber may then be produced simply by joining a plurality of flexible sheets, one at least of these sheets possibly being functionalized with the actuators before being joined.

The interface may be of a variety of shapes, volumes and dimensions, and for example of the order of one centimeter to several tens of centimeters or even of one meter in size.

Walls

The interface according to the invention is flexible in its entirety, by virtue of the deformability of the walls that bound the chamber, at least in the regions between the actuators, and in the region occupied by the one or more walls or any additional layers that are superposed thereon, at least in the regions between the actuators.

In particular, the whole of the interface may have a deformability because of the flexibility both of the wall that defines the touch surface and of the carrier that bears the actuators, which carrier is for example a wall other than the one that defines the touch surface or indeed the same wall.

Preferably, the one or more walls defining the touch surface and serving as carrier for the actuators allow the whole chamber to be bent about at least one axis, and better still in every direction.

The thickness of the one or more walls defining the touch surface and serving as carrier varies for example from a few tens of microns to several mm. This thickness may be substantially constant.

The wall defining the touch surface may be opaque, transparent or translucent. It may serve as an optical guide, if so desired.

The touch surface may be smooth, or have microreliefs. The wall serving as carrier may be opaque, transparent or translucent. The interior faces of the walls defining the touch surface and serving as carrier may be smooth, or have reliefs. In particular, the walls may comprise recesses and/or protrusions, for example in order to facilitate mounting of certain elements such as the actuators, or even allow the walls to be joined together, or local regions that are more flexible or in contrast stiffer, especially level with the protrusions, to be created.

The wall defining the touch surface may have a multilayer structure, especially when it comprises an external detecting system and/or a flexible display. The wall may comprise an interior layer in contact with the fluid, and one or more exterior layers with a view to providing detection and/or display functions. These layers may be joined in various ways, with or without play therebetween, but their arrangement allows, over at least some of their extent, the modifications made to the rheology of the fluid by the actuators to be felt therethrough.

Fluid

The fluid may be opaque, translucent or transparent. It may be colored or colorless. It may be a shear-thickening fluid, shear-thinning fluid, viscoplastic fluid or any other suitable non-newtonian fluid. This fluid may be electrically conductive or not.

Actuators

The actuators preferably make contact with the fluid. Thus, their deformation when they are actuated allows the fluid to be acted upon mechanically directly. In addition, this facilitates the integration of actuators of small size, this being advantageous with respect to giving the interface the sought flexibility. This may also make it easier to mount actuators on the wall serving as carrier, and allow the losses of mechanical power and of spatial resolution that could otherwise be induced by the presence of a more complex mechanical interface between the actuators and the fluid to be avoided.

When they make contact with the fluid, the actuators are especially produced so that the fluid will not induce any short-circuits.

The actuators are distributed within the interface depending on the haptic effects that it is desired to generate. The actuators may be distributed such that the pitch therebetween is not regular, but advantageously they are distributed with a regular spacing in at least one direction, and better still two directions. At least some of the actuators may be arranged in rows and/or columns, and preferably in a regular array.

The integration density of the actuators in a direction varies for example from 50 actuators/cm to 1 actuator/cm. This density may be constant or variable, in one direction or in every direction.

The actuators are for example, for actuators of 1 mm diameter, spaced apart by a distance corresponding to 4 mm center-to-center.

The interface may comprise at least two sets of actuators on either side of the fluid, said sets being placed facing each other or offset. Thus, some of the actuators may be borne by the wall that defines the touch surface. The integration density of the actuators may be the same on either side of the fluid, or it may be different.

The use of two sets of actuators allows the mechanical effect of the actuators on the fluid to be increased, and a better spatial resolution to be obtained when the actuators are placed in an offset manner.

By modulating the amplitude of each actuator and by using or not facing actuators, haptic effects giving an impression of a relief may be generated, with for example locally stiff regions over the entire thickness of the fluid or only some thereof.

The size and shape of the actuators may also play a role in generating more complex haptic effects.

Each actuator may be a piezoelectric actuator, a ferroelectric actuator, an electromagnetic actuator, a thermal actuator or a ceramic piezoelectric actuator. Preferably, the actuator is a ceramic piezoelectric actuator. It is for example possible to use commercially available piezoelectric ceramics, and to thin them to the desired thickness before integrating them into the interface.

The actuators may further comprise a passivation layer, which covers their piezoelectric material, the passivation layer for example making direct contact with the fluid. This makes it possible to prevent the fluid from short-circuiting the actuators.

Each actuator is for example adhesively bonded to the wall serving as carrier, but as a variant fastening may be achieved in another manner, for example by soldering, molding or over-molding.

Membranes

The actuator may be integrated into the interface in various ways.

Preferably, each actuator is borne by an active membrane capable of vibrating under the action of the actuator, the vibration of the membrane acting mechanically on the fluid in the region adjacent the actuator. The presence of such a membrane allows the area accompanying the vibration of the actuator to be increased, and the deformation due to the piezoelectric actuation with a view to acting mechanically on the fluid to be amplified.

The membrane may be defined by one portion of the wall carrying the actuators, this carrying wall possibly being a wall of the chamber that defines an exterior surface of the interface.

As a variant, this carrying wall is isolated from the exterior of the interface, this wall for example being covered by a counter-wall, which for example defines an exterior surface of the interface.

The optional counter-wall is flexible so as to be able to accompany the deformation of the walls bounding the chamber.

The interface may comprise stiffening rings around the membranes bearing the actuators. These rings may be of circular shape or not, and be independent of one another or have segments that are common or joined to one another so as to facilitate placement thereof, the rings for example being formed by the unit cells of a grid.

Each stiffening ring allows the extent of the wall made to vibrate by the actuator to be restricted spatially to the region of the wall that is inside the ring (i.e. located between the interior outline of the ring and the actuator), and therefore the spatial resolution of the generated haptic effect to be improved.

Each ring may be located on the face of the carrying wall opposite the one bearing the actuator or on the same face; the presence of the ring on the opposite face may make it easier to make electrical connections to the actuators.

Each stiffening ring may even be located between the wall that bears the actuator and the aforementioned counter-wall.

The stiffening rings are preferably made of a material that is stiffer than the material of the carrying wall, and for example of a metal, of a hard plastic, of a ceramic, or of glass.

As a variant, the rings may be made of the same material as the carrying wall. Where appropriate, the ring is substantially thicker than the carrying wall, in order to have a stiffness higher than that of the wall, and for example a stiffness 10 times higher.

Detecting System

Preferably, the interface comprises a system for detecting a touch of the user on the touch surface, especially a capacitive or optical detecting system, the control circuit being arranged to control the actuators depending on the position thus detected.

The detecting system may even use, for this detection, at least some of the actuators. In this case, the haptic effect may be generated with only some of the actuators and/or by alternating, as regards at least some of the actuators, a detecting phase in which one or more actuators are used as a touch sensor, and a phase of producing the haptic effect, in which one or more actuators are used to generate a mechanical action.

Thus, when the interface has actuators on the wall defining the touch surface, at least some of these actuators may advantageously be used to detect the touch.

The interface may comprise a system, especially a display covered by the touch surface, allowing an image to be at least partially superposed on the touch surface. A display may as a variant be integrated into an accessory device, for example virtual-reality goggles, and the generated haptic effect synchronized with the displayed or projected image.

Applications

The invention also relates to an article, especially an item of clothing, in particular a glove or a jacket, equipped with a haptic interface according to the invention.

The interface may also comprise at least one actuator allowing the interface to be selectively shaped into at least two distinct shapes. Preferably, the interface comprises a plurality of actuators. The shape of the interface may be configured to correspond to an object the image of which is simultaneously viewed by the user, for example via virtual-reality goggles. Haptic effects simulating the texture of the viewed object may then be generated on the touch surface of the interface.

Tactile Stimulus

Yet another subject of the invention is a method for generating at least one tactile stimulus capable of being felt by a user touching an interface according to the invention, comprising the steps of:

detecting the position of the touch of the user on the flexible touch surface of the interface by virtue of a detecting system, modulating, by virtue of a control circuit, the signals sent to the actuators in order to make vary locally the stiffness of the fluid in certain regions of the chamber and to generate an effect perceptible tactilely by the user.

The touch of the user on the touch surface may be detected, where appropriate, as mentioned above, by virtue of at least some of the actuators, especially via the piezoelectric effect when the actuators are piezoelectric actuators.

The stiffness variation that generates a tactile stimulus may in certain cases give the user the impression of touching a surface having a relief.

The tactile stimulus may also be generated so as to give the user the impression of pressing on a key.

Production of an Actuator

The invention also relates to a process for manufacturing a ceramic piezoelectric actuator usable in an interface according to the invention such as defined above, comprising the steps of:

depositing at least a first layer of a conductive material on the upper face of a flexible carrier, preferably a flexible polymer sheet, fastening a piezoelectric ceramic to the conductive layer thus formed, depositing, especially by inkjet printing, a layer of a conductive material on the piezoelectric ceramic, depositing a layer of an electrical insulator, which is preferably deposited by printing, on the layers deposited beforehand.

The flexible carrier preferably forms the wall that serves as carrier for a plurality of actuators, and for example all thereof, and may define an exterior surface of the interface or be lined externally with a counter-wall.

The actuators may be produced individually, or simultaneously on the same carrier.

The insulating layer covering the actuator allows the actuator to be electrically insulated from the fluid. It may individually cover each actuator or as a variant continuously cover all the actuators fastened to a given carrier.

Production of the Interface

The invention also relates to a process for manufacturing an interface such as defined above, comprising the step of:

joining two flexible walls, especially by welding or adhesive bonding, so as to form a chamber, at least one of the walls having actuators on one of its faces.

The chamber thus obtained is filled with a non-newtonian fluid. For example, when the walls are being joined, an aperture that allows the chamber to be filled may be created, which aperture is subsequently closed, for example by welding or by adhesive bonding.

The walls comprise or are for example polymer sheets, especially thermoplastic sheets, and optionally elastomer sheets. The walls may have a single-material or multi-material structure, this structure possibly being spatially homogenous or in contrast comprising local recesses, more flexible hinges. etc.

The one or more walls may have a multilayer structure in order to incorporate a detecting system and/or a display. as mentioned above.

BRIEF DESCRIPTION OF THE DRAWINGS

The invention will possibly be better understood on reading the following detailed description of non-limiting examples of implementation thereof, and on examining the appended drawing, in which.

DETAILED DESCRIPTION

Figure 1:
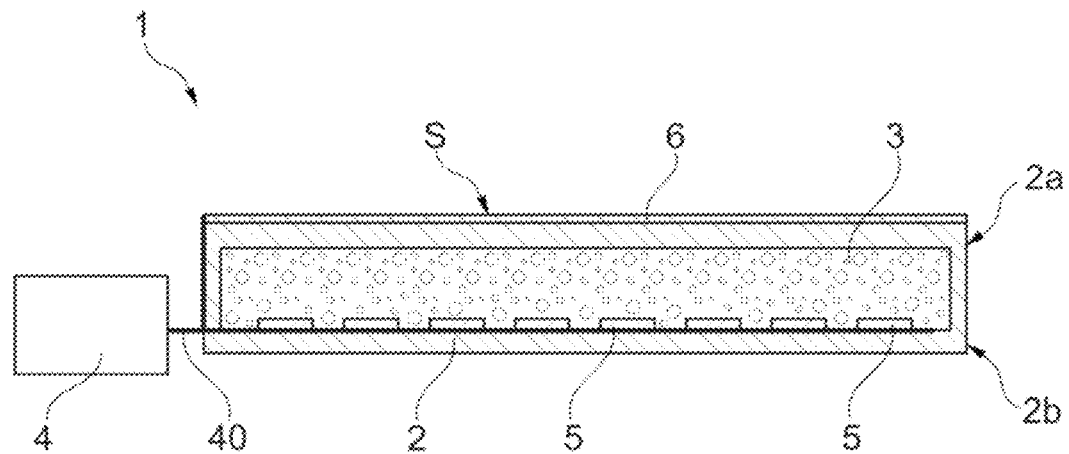
FIG. 1 partially and schematically shows one example of a flexible haptic interface according to the invention, FIG. 2 partially and schematically shows one example of a wall of the interface serving as carrier for the actuators, FIG. 3 partially and schematically illustrates one example of arrangement of the actuators, FIG. 4 partially and schematically illustrates another example of arrangement of the actuators, FIG. 5 partially and schematically shows one example of a flexible haptic interface equipped with a display and with a loudspeaker, FIG. 6 partially and schematically shows one example of a flexible haptic interface coupled to virtual-reality goggles, FIG. 7A partially and schematically shows one example of integration of an actuator into a wall of the interface, FIG. 7B partially and schematically illustrates the vibration of the wall subjacent the actuator of FIG. 7A when said actuator is actuated, FIG. 8A partially and schematically shows one example of integration of an actuator into a wall equipped with a stiffening ring, FIG. 8B partially and schematically illustrates the vibration of the wall subjacent the actuator of FIG. 8A when said actuator is actuated.

FIG. 1 illustrates one example of a flexible interface 1 according to the invention. The interface 1 comprises a chamber 2, of flat shape in the example in question, mainly bounded by two flexible opposite walls 2a, 2b each defining one exterior face of the interface.

The exterior face of the upper wall 2a defines a touch surface S that a user may touch, for example with his finger, and perceive a haptic sensation generated by the interface 1.

In the example in question, the surface S may adopt a substantially planar or curved configuration.

The interface comprises a detecting system 6, for example a known prior-art capacitive system, allowing at least one point of contact of the finger of the user with the surface S to be detected.

The detecting system 6 may form part of the wall 2a; it has been shown in FIG. 1 schematically in the form of an exterior layer of the wall 2a.

The chamber 2 is closed and filled with a non-newtonian fluid 3. By "non-newtonian", what is meant is a fluid that does not deform proportionally to the force that is applied thereto, and especially a fluid the viscosity of which depends on the exerted force. It may for example be a shear-thickening fluid, i.e. a fluid the viscosity of which increases when a shear stress is applied thereto. As a variant, it may be a shear-thinning fluid, or a viscoplastic fluid. Various types of non-newtonian fluids may be used. A shear-thickening fluid 3 is for example obtained by mixing water and corn starch in the correct proportions. More generally, many types of fluids comprising particles suspended in a liquid have non-newtonian properties. Fluids containing polymers, such as certain shampoos, gels, bleaching agents, cleaning agents or even multigrade oils to which polymers are added, may thus exhibit a non-newtonian rheology.

The lower wall 26 serves as carrier for a plurality of actuators 5 placed on the internal face of the wall 2b so as to make contact with the fluid 3. The actuators 5 are connected to a control circuit 4 by wire links 40.

The control circuit 4 is configured to modulate the signals sent to the actuators 5 in order to make the latter mechanically induce by vibrating a modification of the viscosity of the fluid 3 that is sufficient to be tactilely perceptible by the user on the surface S. The actuators 5 may be actuated individually, or alternately in groups, depending on the desired aim.

The detecting system 6 is also connected to the control circuit 4, in order to generate the haptic effect in the region detected to have been touched, if such is desired.

Figure 2:
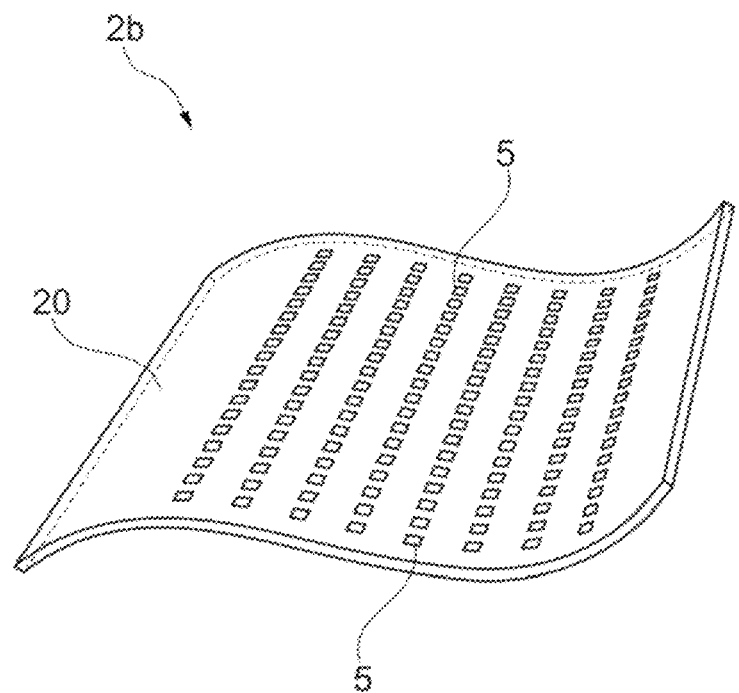

In certain embodiments, the wall 2b serving as carrier for the actuators may be defined by a flexible sheet 20 such as illustrated in FIG. 2, for example a sheet of a polymer, for example polyethylene naphthalate (PEN) or polycarbonate (PC). The sheet is for example of thickness equal to about 250 μm.

In the example illustrated in FIG. 2, the actuators 5 are regularly distributed over the sheet 20 so as to form a regular array, but other distributions are possible, as described below.

The actuators 5 may all be identical and have the same dimensions, as illustrated, or conversely have different shapes and/or dimensions. Depending on the application, provision may be made for large actuators to simulate large features in certain regions and smaller actuators in other regions in order to achieve haptic effects of better spatial resolution in these other regions.

Figure 3:
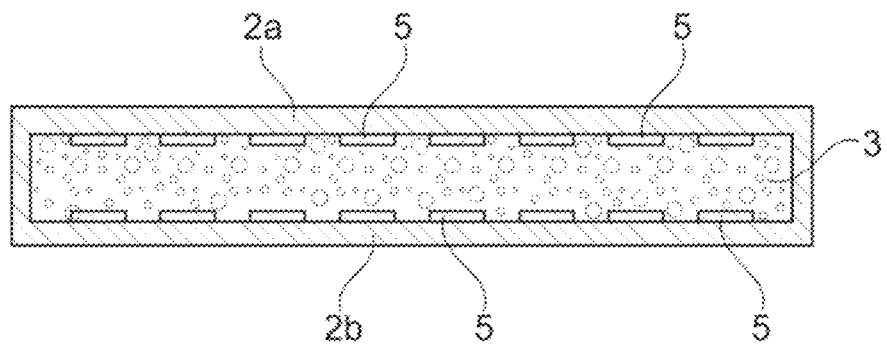

The actuators 5 may be placed within the chamber 2 on a plurality of its walls, and in various configurations. They may for example be located on the two opposite main walls 2a and 2b of the chamber 2, on either side of the fluid 3, and aligned facing one another, such as illustrated in FIG. 3. Such an arrangement allows the mechanical effect of the actuators 5 on a given volume of fluid 3 to be increased.

Figure 4:
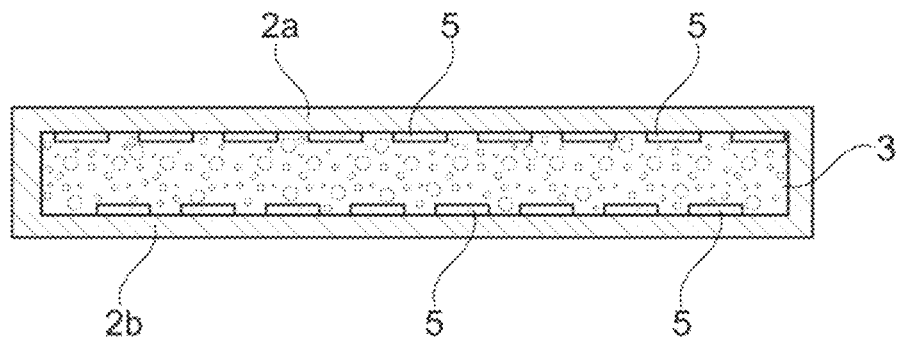

In the variant illustrated in FIG. 4, the actuators are located on either side of the fluid 3 in an offset manner, this allowing the spatial resolution of the haptic interface to be increased and/or more complex haptic effects to be generated, depending on the actuators employed. This offset may be such that the actuators carried by the wall 2a are centered on the middle of the intervals between the actuators of the opposite wall 2b, as illustrated. As a variant, the pitch between the actuators on the wall 2a is different from the pitch between the actuators of the wall 2b, and for example a multiple thereof. The offset may nonetheless be achieved differently.

The interface 1 may comprise one or more accessory devices allowing user experience to be improved, and especially it to be made a multisensory experience.

Figure 5:
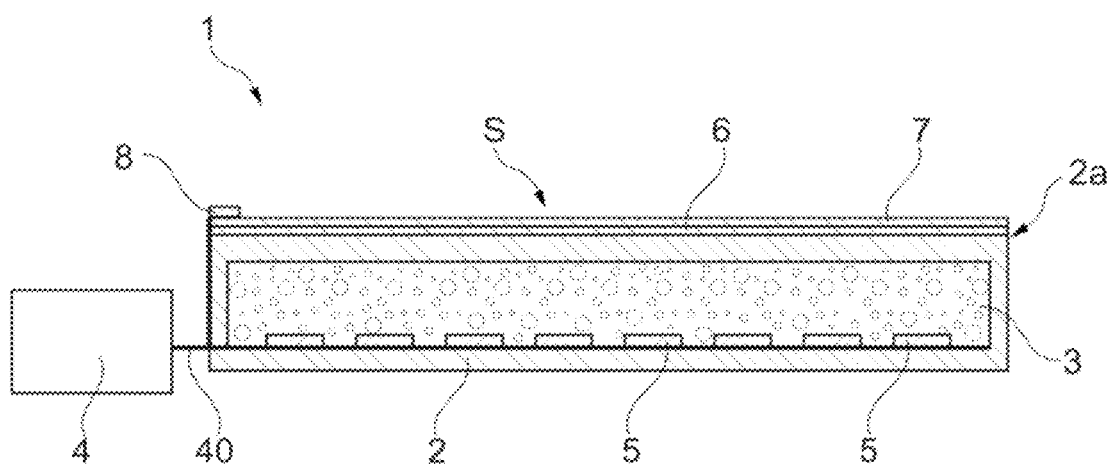

In the example illustrated in FIG. 5, the interface comprises a flexible display 7 that allows an image to be superposed on the touch surface S and for example the user to be given the impression of touching, virtually, what he sees on the display 7. In the example in question, the display 7 has been shown schematically as covering the detecting system 6, but forming part of the wall 2a. In a variant, the display 7 and/or the detecting system 6 are not integrated into the wall 2a of the chamber 2.

Figure 6:
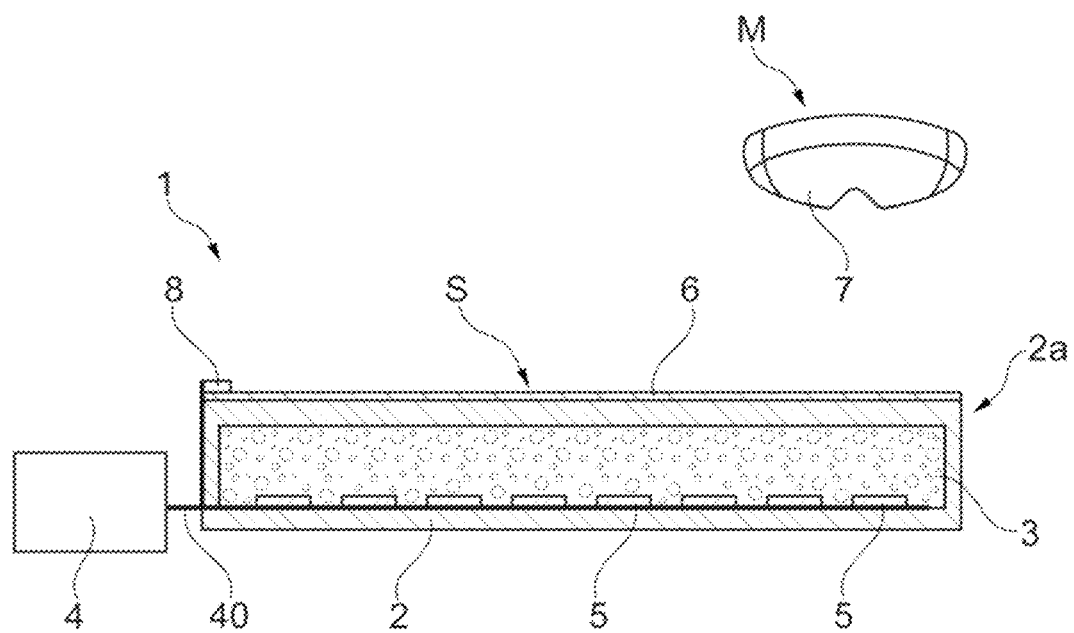

The interface 1 may further comprise one or more loudspeakers 8 with a view to adding an audio effect to the experience. As a variant, the display 7 is fastened to a mounting M that may be worn by the user, to virtual-reality goggles for example such as illustrated in FIG. 6. The images displayed on the display 7 may be seen by the user, who is able to simultaneously touch the touch surface S, the control circuit 4 being configured to allow the actuators 5 to generate a haptic effect concordant with the image projected or displayed via the mounting.

The actuators 5 are preferably piezoelectric. When an actuator receives an electrical signal from the control circuit 4, it may contract or extend via the inverse piezoelectric effect, especially in the direction parallel to the carrier to which it is fastened. In this case, the piezoelectric material will induce mechanical coupling to the carrier and therefore, via a bimaterial effect, then generate an oscillatory movement.

The carrier of each actuator 5 may define an active membrane 21. The latter may be formed by one portion of the wall 2b of the chamber 2.

The vibratory behavior of the actuator 5 and of the subjacent active membrane 21 depends on the way in which the actuator is integrated into its carrier. This integration may be according to a number of configurations, and the corresponding vibratory behavior may be simulated by virtue of a finite-element-analysis software package such as for example the software package COMSOL, or any other suitable software package. A plurality of examples of configurations are described below, as is the vibratory behavior of the associated membrane.

Figure 7A:
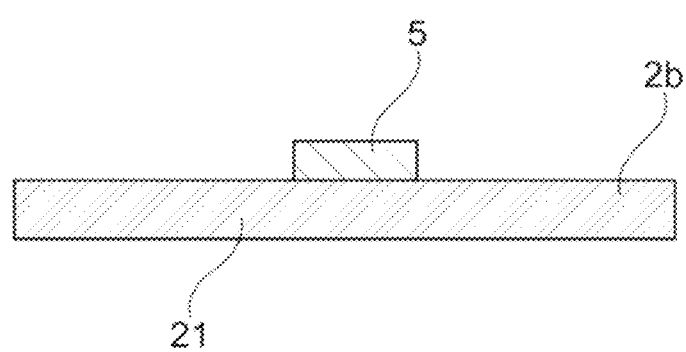

In the configuration illustrated in FIG. 7A, the actuator 5 is fastened to a carrying wall 2b that defines an exterior surface of the interface 1.

Figure 7B:
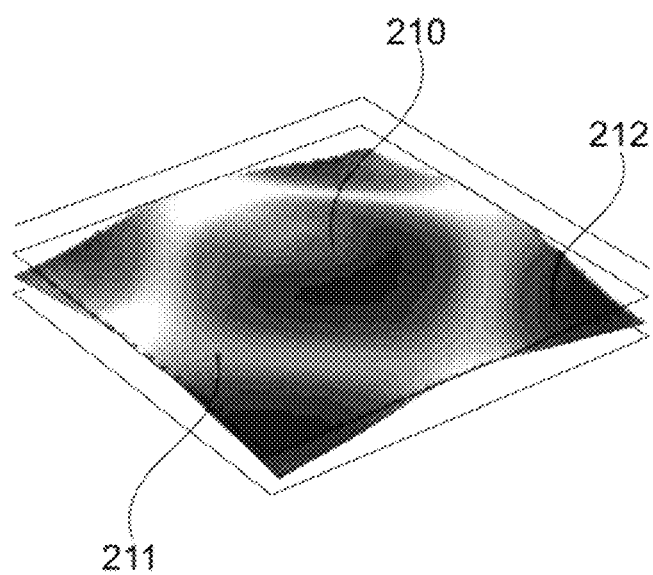

In this configuration and as illustrated in FIG. 7B, the vibration of the actuator 5 generates a large relative movement of the membrane 21 in a central region 210 located under the actuator. A region 211 encircling the central region 210 sees no particular movement. In contrast, parasitic movements of the wall 2b are visible beyond the region 211, in further-off regions 212. These parasitic movements are undesirable because they result in a not very localized action on the non-newtonian fluid, and therefore affect the spatial resolution of the haptic effect.

Figure 8A:
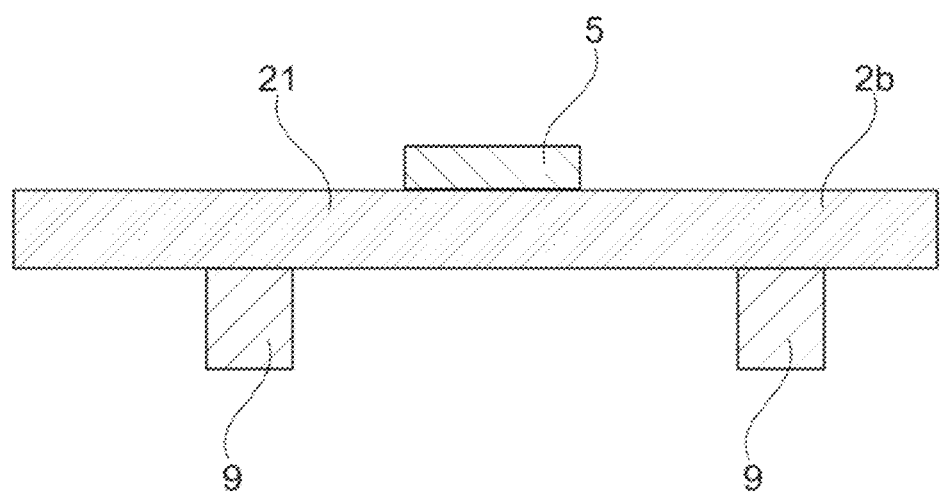
Figure 8B:
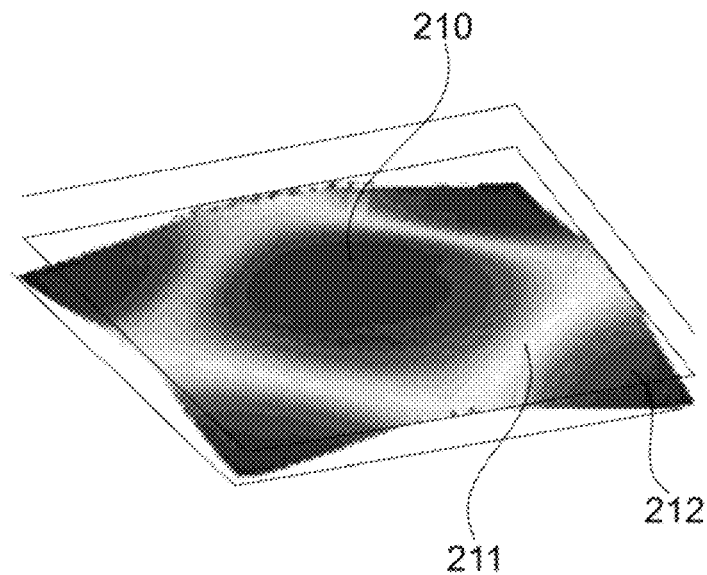

The addition of a stiffening ring 9 under the wall 2b delineating the outline of the active membrane 21, such as illustrated in FIG. 8A, allows the amplitude of the parasitic movements in the regions 212 to be limited, even if they still remain visible in FIG. 8B. The stiffening ring is for example made of copper, aluminum, hard plastic, or any other suitable material.

Figure 9A:
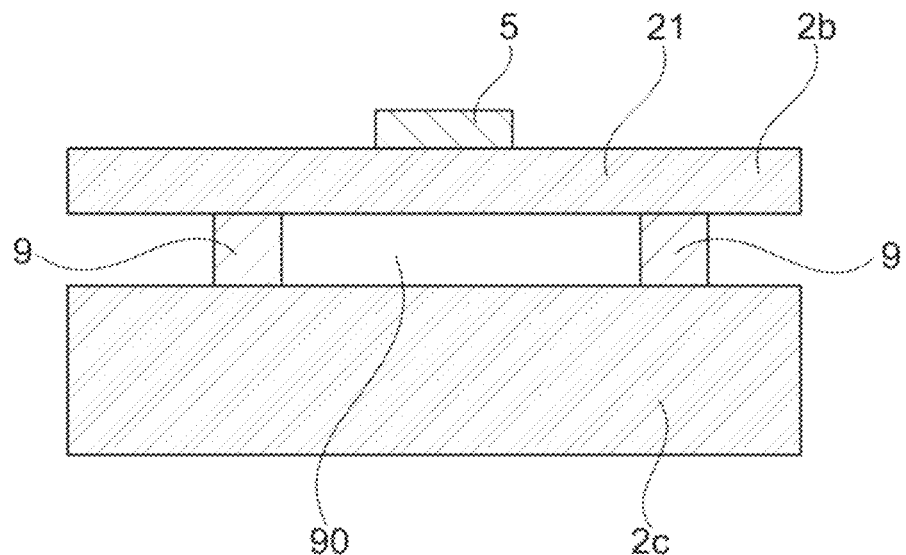
FIG. 9A partially and schematically shows one example of integration of an actuator into a double wall, FIG. 9B partially and schematically illustrates the vibration of the wall subjacent the actuator of FIG. 9A when said actuator is actuated, FIG. 10 partially and schematically shows one example of an interface comprising an actuator array integrated into one wall according to the mode of integration of FIG. 9A.
Figure 9B:
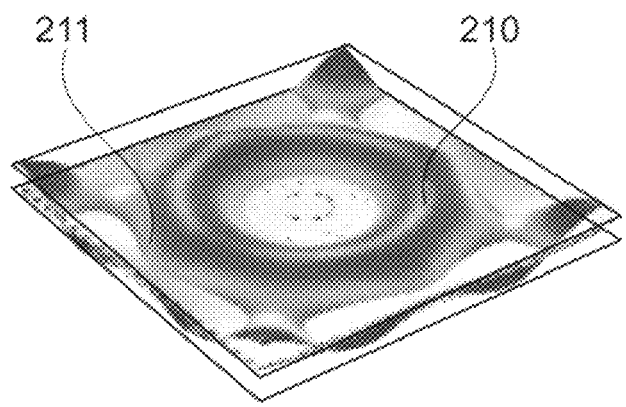

In the variant illustrated in FIG. 9A, an exterior wall 2c, also called the counter-wall, has been added, the stiffening ring 9 being secured to the walls 2b and 2c and playing the role of a spacer therebetween. In this variant, the membrane 21 is held away from the wall 2c by virtue of the stiffening ring 9, and an air-filled gap 20 may be present between the walls 2b and 2c. In this configuration, the movement of the wall 2b under the action of the vibration of the actuator 5 is restricted to the central region 210 in which the actuator is located, and the parasitic movements of the wall 2b are practically absent, as illustrated in FIG. 9B.

By way of example, for a wall 2b made of PEN of thickness of the order of 250 μm and a piezoelectric actuator made of lead zirconate titanate (PZT) of thickness of the order of 30 μm and of radius of about 2500 μm, it is possible to obtain a deformation of the membrane 21 of the order of 5 μm when the actuator 5 is subjected to an AC voltage of 50 V at a frequency of 1.82 kHz. At this frequency, the non-newtonian fluid 3 is stressed enough locally to harden and generate for example the perception of a "pseudo-relief" on the touch surface S of the interface 1.

The parasitic movements of the wall subjacent the actuators may be decreased in a way other than adding a stiffening element 9 and a counter-wall 2c: this goal may especially be achieved by actuating neighboring actuators with a phase shift dependent on the distance between the actuators, and especially in phase opposition.

Figure 10:
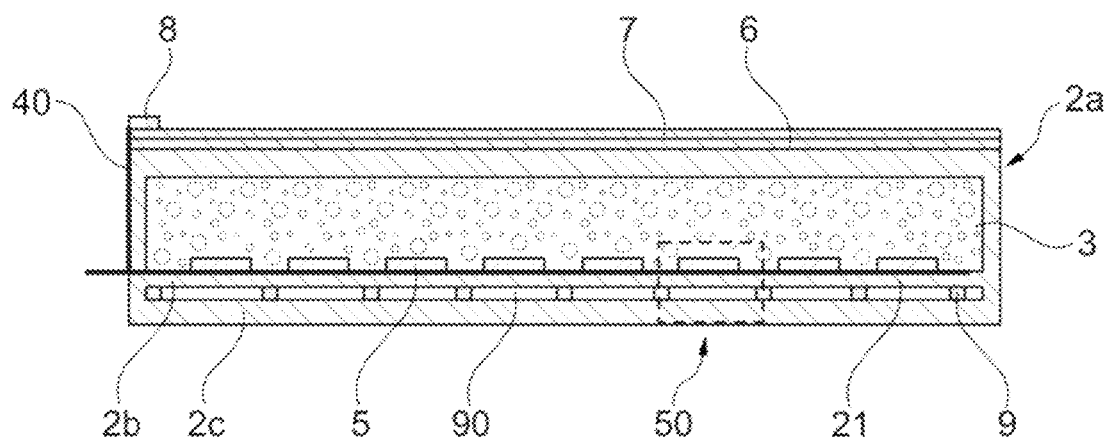

FIG. 10 shows a plurality of actuators 5 integrated according to the preceding configuration with counter-wall 2c. The latter in this example defines an exterior surface of the interface.

The thickness of the wall 2c is for example 500 μm. A larger thickness allows the parasitic movements of the wall 2b that were mentioned above to be substantially limited, but in return may decrease the overall flexibility of the interface 1.

The thickness of the wall 2c may be chosen during production of the interface 1 depending on the application in question and the sought haptic effect.

By way of example, the relative thickness of the wall 2c with respect to the wall 2b is a factor of 10.

Figure 11:
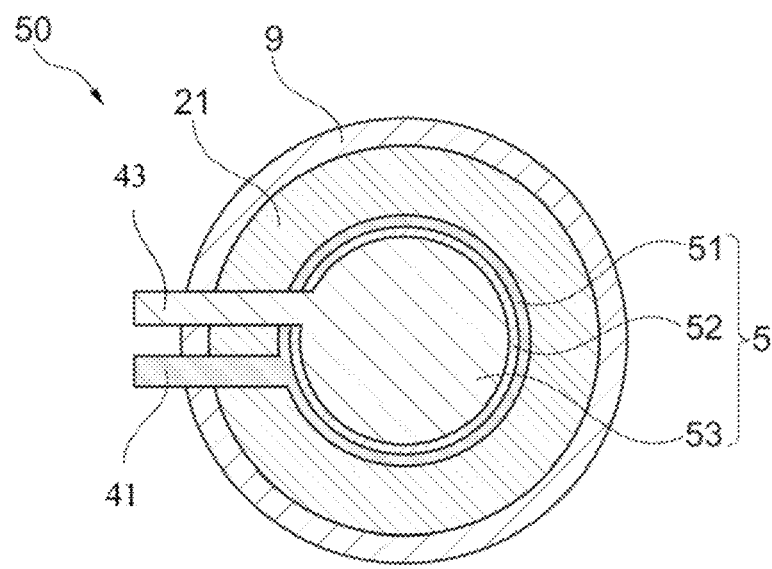
FIG. 11 is a partial and schematic face-on view of an actuator of FIG. 10, FIG. 12 partially and schematically shows one example of embodiment of a matrix array of actuators able to generate various tactile stimuli, FIG. 13 partially and schematically illustrates the ability to generate a key-click touch effect using the matrix array of actuators of FIG. 12, FIG. 14 partially and schematically illustrates the ability to generate a relief touch effect using the matrix array of FIG. 12, FIG. 15, FIG. 16, FIG. 17 and FIG. 18 partially and schematically illustrate successive steps of one example of a process for manufacturing a ceramic piezoelectric actuator, FIG. 19 partially and schematically illustrates one step of one example of a process for manufacturing an interface according to the invention, FIG. 20 partially and schematically illustrates another step of the manufacturing process.

The actuator 5 may be of various shapes, for example circular, such as illustrated in FIG. 11. In this example, the actuator 5 comprises a lower electrode 51 connected to the control circuit 4 by a conductive track 41, which is for example made of metal, an active layer 52 for example made of piezoelectric or ferroelectric material, and an upper electrode 53 connected to the control circuit 4 by a conductive track 43, which is for example made of metal. The electrodes 51 and 53 are preferably insulated from each other by a passivation layer (not shown).

As described above, the actuator 5 may be carried by an active membrane 21.

When an actuator 5 receives a signal from the control circuit 4, a potential difference is applied across the electrodes 51 and 53. The signal received by the actuator 5 is for example a complex AC signal. The applied potential difference generates a deformation of the active layer 52, especially via the inverse piezoelectric effect, this driving a movement of the active membrane 21.

Figure 12:
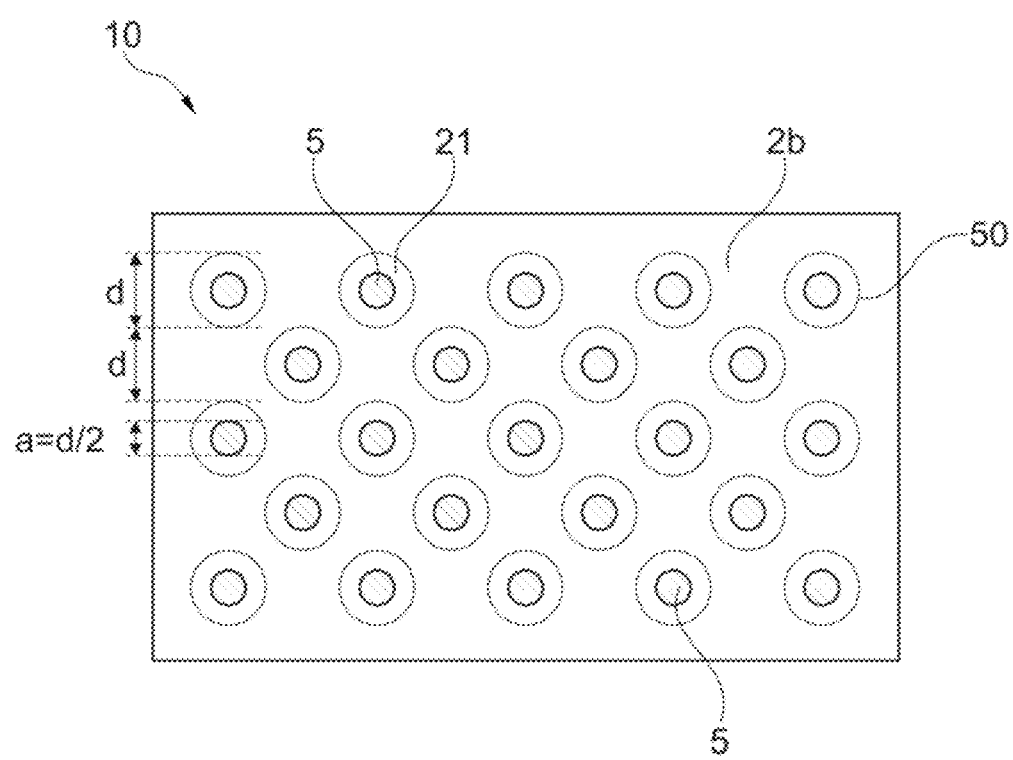

FIG. 12 shows an example of a matrix array 10 of actuators 5. By "matrix array", what is meant is a structure of integral construction bearing a plurality of actuators, whether identical or not. The matrix array 10 is for example rectangular and of dimensions for example of a few centimeters per side.

The actuators 5 are in this example identical, each of circular shape and distributed uniformly over the matrix array 10, staggered. The active membrane 21 of each actuator 5 is for example of circular shape.

In other embodiments, the active membrane 21 is of non-circular shape, and for example of polygonal shape, and especially of square shape, rectangular shape, or any other suitable shape, whether 2D or 3D, the membrane possibly being of convex or concave form.

The diameter a of the actuator 5 (i.e. generally its largest dimension) is for example 2500 µm and of the order of 50% of the diameter d of the active membrane 21, this ratio being, advantageous with regard to achieving satisfactory deformation of the membrane, as described in the article by Casset, F., et al. "Piezoelectric membrane actuator design." (12th Intl. Conf. on Thermal, Mechanical & Multi-Physics Simulation and Experiments (Eurosime) 2011).

The active membranes 21 are for example separated from one another by a distance d equal to the diameter of the membrane 21, this separating distance being advantageous with regard to allowing the haptic effect to be generated with a satisfactory spatial resolution.

In other examples of embodiment, the distance separating the membranes and/or the number of membranes in the matrix array 10 are different. Indeed, there may be merely one isolated membrane.

The diameter of the membrane 21 is for example of the order of 10 µm to 100 000 µm. The actuators 5 for example comprise an active layer made of lead zirconate titanate (PZT), and their thickness is for example 30 µm.

Figure 13:
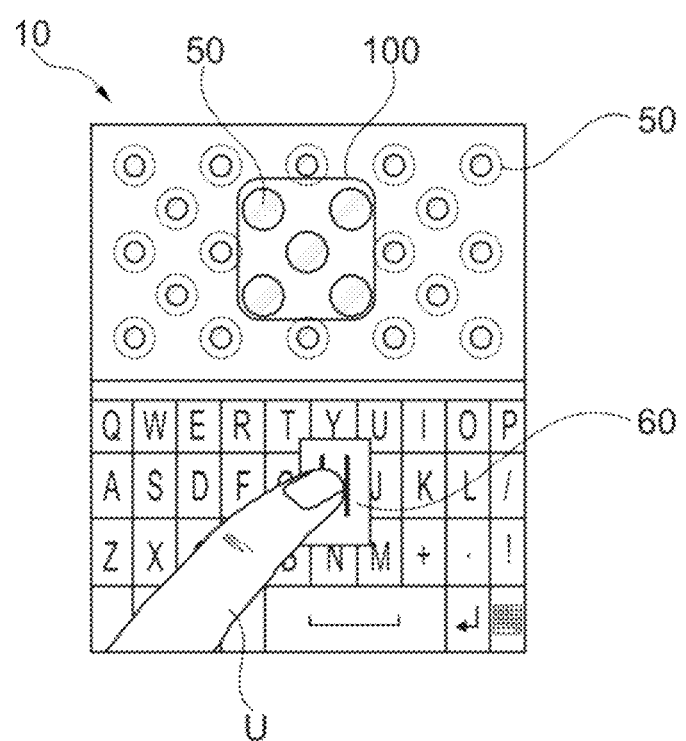

In the example illustrated in FIG. 13, a group 100 of actuators in the matrix array 10 is actuated by the control circuit 4 in order to generate a tactile stimulus 60 of a "key-click effect", i.e. one giving the user the impression of having pressed on a keyboard key.

Figure 14:
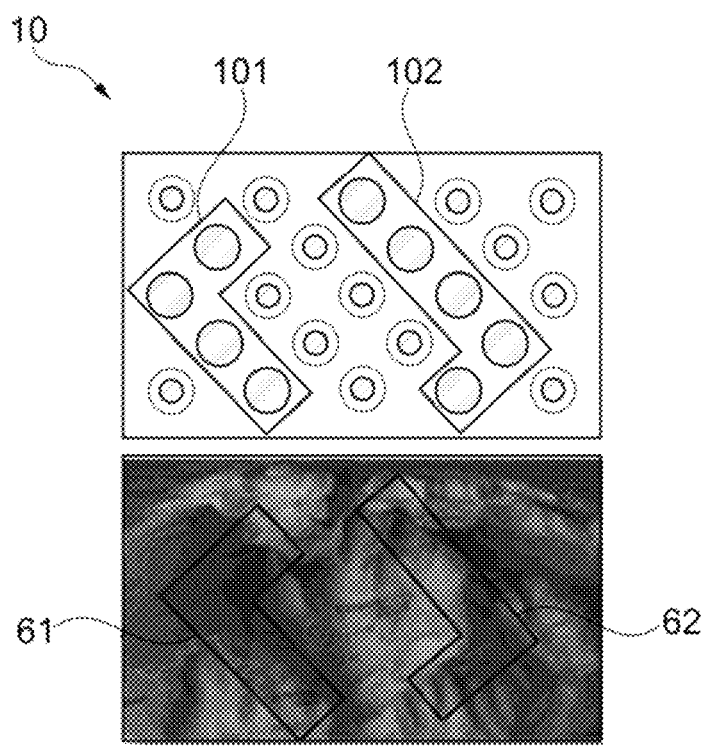

In another example illustrated in FIG. 14, a plurality of groups 101 and 102 of actuators are actuated simultaneously or alternately in order to generate tactile stimuli 61 and 62 of a pseudo-relief effect, i.e. one giving the user, who is moving his finger touching the interface, the impression of brushing against reliefs, for example the peak of a mountain of a map displayed on a screen.

In the examples that have just been described, the actuators 5 of a given group may be modulated with an actuation amplitude that is identical for all the actuators of the group, or that is specific to each actuator, depending on the sought effect.

A piezoelectric actuator 5 may be produced by carrying out the steps illustrated in FIGS. 15 to 18.

Firstly, a first layer 54 of an electrically conductive material, silver for example, is deposited, for example by screen-printing, on the upper face of a flexible carrier 2b in order to form the track for supplying electrical power to the actuator 5, optionally in the form of a pad. As described above, the flexible carrier 2b is for example a sheet of a polymer such as PEN, PC, PMMA, polyamide, SiNR or any other suitable material. The carrier 2b may also comprise a plurality of layers of a plurality of polymers. Its thickness is for example 80 µm. The layer 54 is for example 0.5 µm in thickness.

Next, a piezoelectric ceramic comprising a lower electrode 51, a piezoelectric layer 52 and an upper electrode 53 is deposited on the layer 54. The piezoelectric ceramic is for example a commercially available piezoelectric ceramic made of lead zirconate titanate (PZT). The latter may especially be thinned and adjusted to a desired thickness.

Figure 15:
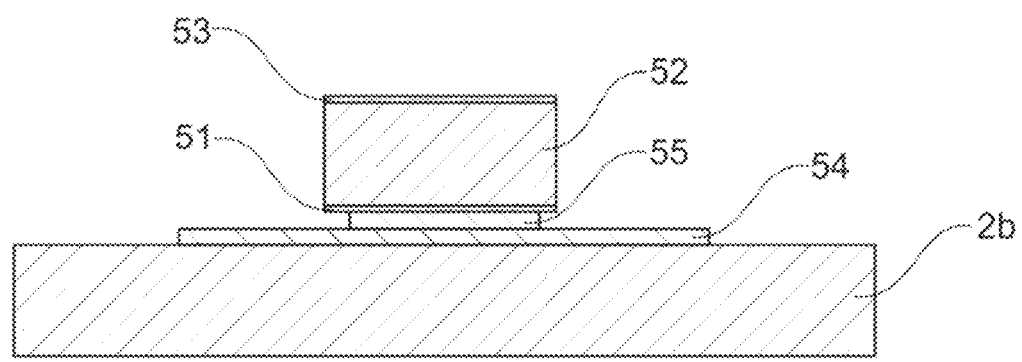

As illustrated in FIG. 15, the lower electrode 51 of the piezoelectric ceramic may be connected to the track 54 by virtue of a layer of conductive adhesive 55, a silver paste for example, for example of about 40 µm in thickness. The deformation of the piezoelectric layer 52 under the effect of a potential difference applied between the electrodes is transmitted to the carrier 2b via a unimorphic effect via the layer 55.

Figure 16:
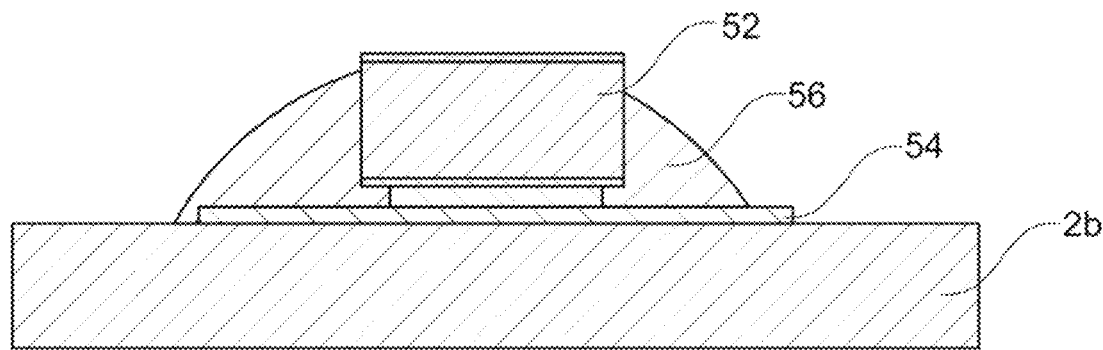
Figure 17:
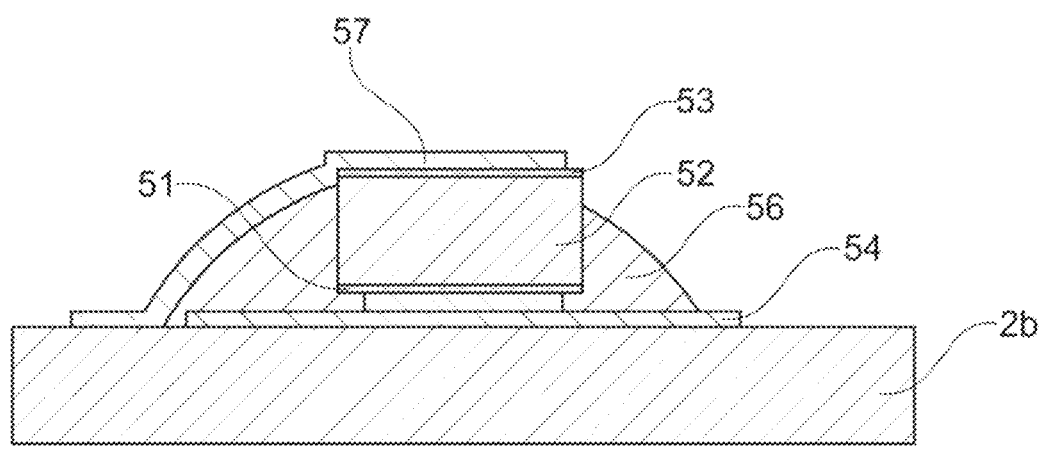

Next, one portion of the piezoelectric ceramic is covered with an electrically insulating layer 56, which is for example a polymer head, as illustrated in FIG. 16. The insulating layer 56 makes it possible to be able to deposit, by inkjet printing or another suitable method, a conductive track 57 connected to the upper electrode 53 while avoiding short circuits, especially with the electrode 51, as illustrated in FIG. 17. The track 57 may take the form of a pad, where appropriate. The layer 57 is for example 0.5 µm in thickness.

Figure 18:
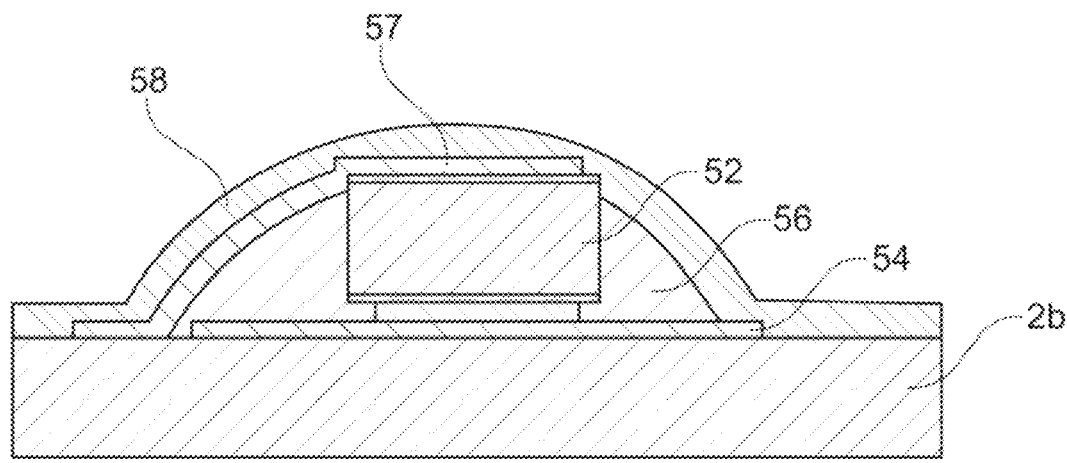

Lastly, in the step illustrated in FIG. 18, the actuator is electrically insulated from the fluid 3 by virtue of an insulating layer 58, which is for example made of silicone. The tracks (not shown) connected to the electrodes 51 and 53 allow the actuators 5 to be actuated by the control circuit.

A stiffening ring 9 may be added and fastened, especially by adhesive bonding, to the back side of the flexible carrier 2b, if so desired. The insulating layer 58 may continuously cover all of the actuators borne by the carrier 2b.

As described above, it is possible to obtain a haptic interface according to the invention by joining two flexible sheets 20 forming the two flexible opposite walls 2a and 2b of the chamber 2, respectively.

Figure 19:
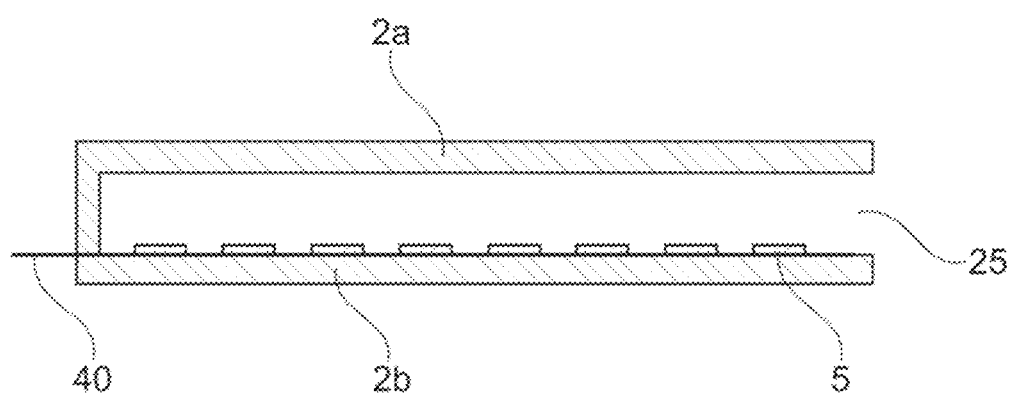
Figure 20:
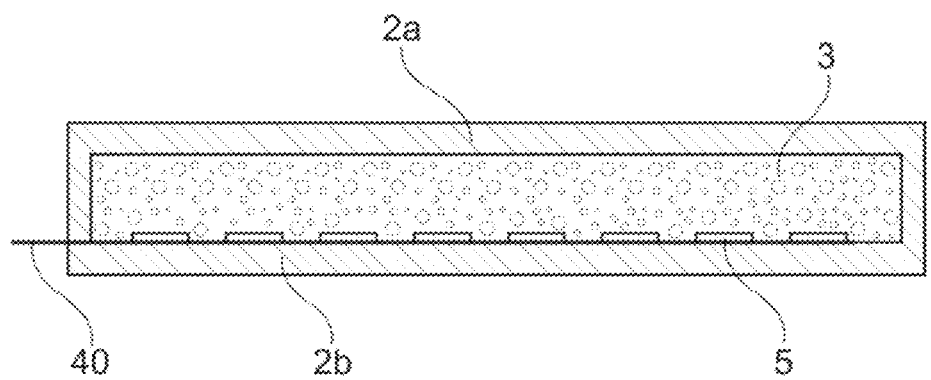

In the example of manufacture of such an interface illustrated in FIG. 19, initially an aperture 25 allowing the chamber to be filled is left when the sheets 20 are being joined. This allows the non-newtonian fluid 3 to be introduced, for example by virtue of a syringe or by any other suitable injecting means. Subsequently, the aperture 25 is closed, for example by welding or adhesive bonding, to obtain the flexible haptic interface illustrated in FIG. 20.

After filling and closure, the thickness of the fluid 3 may be substantially constant in the chamber 2, and for example of the order of several hundred µm to several mm, 3 mm for example.

Figure 21:
FIG. 21 is a block diagram illustrating one example of operation of the haptic interface according to the invention.

A haptic interface 1 according to the invention may operate according to the steps illustrated in FIG. 21.

In step 81, the haptic interface is on standby, in the absence of a user touching the touch surface S, and the non-newtonian fluid has rheological properties that are uniform over the entire touch surface S.

In step 82, the detecting system 6, which is for example produced with some of the actuators 5 or with any other suitable, capacitive for example, detecting system, detects at least one point where the user is touching the surface S and the control circuit 4 determines the location in which the one or more haptic effects must be generated.

In step 83, the control circuit 4 sends suitable control signals to actuate at least some of the actuators 5 so as to generate the desired haptic effect.

In step 84, the actuators 5 in question contract or extend via the inverse piezoelectric effect with an actuation amplitude corresponding to the received signal, driving the active membrane 21 that is subjacent thereto to make an oscillatory movement.

In step 85, the fluid 3 in proximity to the membranes 21 sees its viscosity vary depending on the amplitude of vibration, this generating a modification of rheological properties, for example a local hardening of the fluid, that is perceptible by the user on the surface S.

In step 86, the user breaks contact with the touch surface S and the interface may return to standby, if it is desired to save energy for example.

Figure 22:
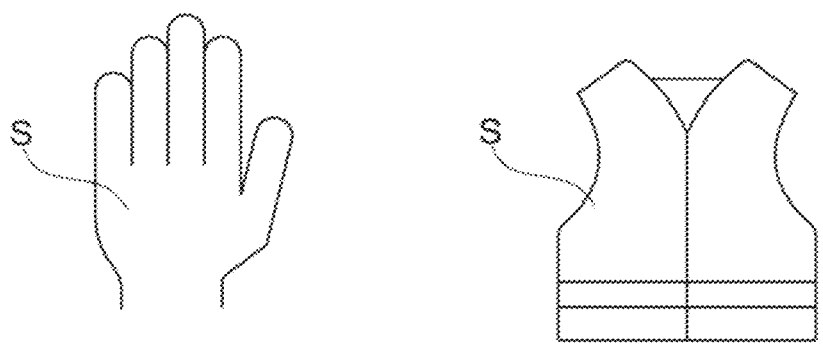
FIG. 22 illustrates examples of articles equipped with a flexible haptic interface according to the invention.

The interface 1 according to the invention may be integrated into an article of clothing, a glove or a vest for example, as illustrated in FIG. 22.

Of course, the invention is not limited to the examples that have just been described.

Figure 23:
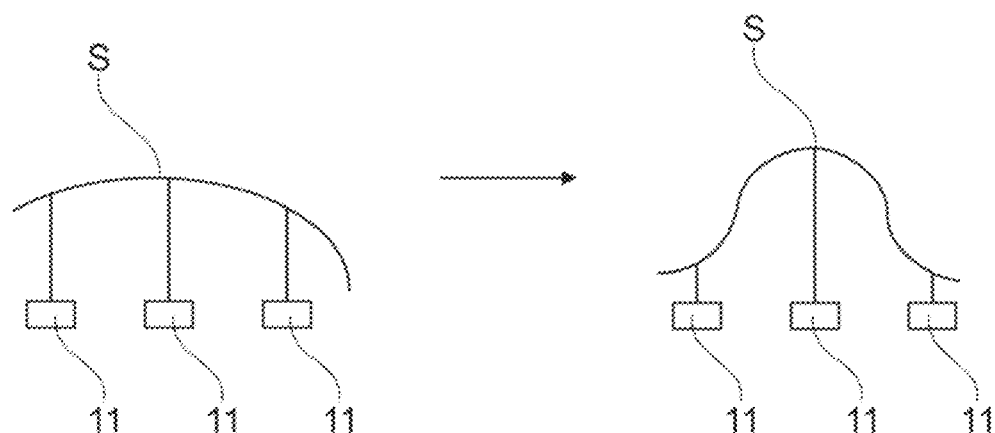
FIG. 23 illustrates the ability to modify the shape of the interface using actuators.

For example, the interface 1 may comprise a touch surface, and/or a detecting system 6, on a plurality of its walls, or even on all of its one or more exterior faces. The chamber 2 may have a shape other than the one described above; it is for example of spherical or cylindrical shape, or it may even change shape depending on the sought haptic effect, the interface 1 possibly being a reconfigurable tangible object as illustrated in FIG. 23. In this figure, it may be seen that the interface may be mechanically coupled to one or more actuators 11 that allow it to be deformed in order to give it a predefined shape, corresponding to that of the object that it is sought to simulate tactilely.

The actuators 5 may be of any size and of any shape. Sets of actuators of various sizes are for example placed with a concentric distribution on one wall of the interface. Many actuators of small size, for example of about twenty μm in width, may be used in order to obtain a high spatial resolution.

The stiffening ring 9 is not necessarily of circular shape; it may be of any suitable shape chosen depending for example on the position of the nodes and anti-nodes of vibration of the wall bearing the actuator.

The interface may operate otherwise than via local hardening of the fluid 3 in the regions in which the actuators are used; operation may be adapted to a shear-thinning fluid, the viscosity of which decreases under the effect of the actuators.

The actuators may be produced otherwise than with the manufacturing process described above. For example, the active layer 52 is produced by transferring thin films of piezoelectric or ferroelectric materials, especially made of lead zirconate titanate (PZT), aluminum nitride (AlN) or lithium niobate (LNO), or even a multilayer of electroactive polymers, such as polyvinylidene fluoride (PVDF).

The invention claimed is:

1. Flexible haptic interface, comprising:
a chamber containing a non-newtonian fluid and bounded at least partially by a flexible wall the exterior face of which defines a touch surface capable of being touched by a user,
a plurality of actuators borne by a flexible carrier and placed so as to transmit a local mechanical excitation to the fluid, and
a control circuit connected to the actuators and configured to modulate the signals sent to the actuators in order to mechanically induce a modification of the rheology of the fluid and to generate a haptic sensation perceptible by the user on the touch surface.

2. Interface according to claim 1, the chamber having a flat general shape.

3. Interface according to claim 1, the chamber having a constant thickness.

4. Interface according to claim 1, the chamber being formed between at least two opposite flexible walls, one at least of which walls defines the touch surface.

5. Interface according to claim 1, the one or more walls defining the touch surface and serving as carrier for the actuators allowing the whole chamber to be bent about at least one axis.

6. Interface according to claim 1, the actuators making contact with the fluid.

7. Interface according to claim 1, the actuators being distributed with a regular spacing in at least one direction.

8. Interface according to claim 1, each actuator being borne by an active membrane capable of vibrating under the action of the actuator, the vibration of the membrane acting mechanically on the fluid in the region adjacent the actuator.

9. Interface according to claim 8, the membrane being defined by at least one portion of a wall serving as carrier for the actuators, said wall defining an exterior surface of the interface.

10. Interface according to claim 8, the membrane being defined by at least one portion of a wall serving as carrier for the actuators, said wall being covered by a counter-wall.

11. Interface according to claim 8, comprising stiffening rings around the membranes of the actuators.

12. Interface according to claim 1, comprising a system for detecting a touch of the user on the touch surface, the control circuit being arranged to control the actuators depending on the position thus detected.

13. Interface according to claim 1, comprising a system, especially a display covered by the touch surface, allowing an image to be at least partially superposed on the touch surface.

14. Interface according to claim 1, comprising at least one actuator allowing the interface to be selectively shaped into at least two distinct shapes.

15. Method for generating at least one tactile stimulus capable of being felt by a user touching an interface as defined in claim 1, comprising the steps of:
detecting the position of the touch of the user on the flexible touch surface of the interface by virtue of a detecting system,
modulating, by virtue of a control circuit, the signals sent to the actuators in order to make vary locally the stiffness of the fluid in certain regions of the chamber and to generate an effect perceptible tactilely by the user.

16. Method according to claim 15, the touch of the user on the touch surface being detected by virtue of at least some of the actuators.

17. Method according to claim 15, the stiffness variation generating a tactile stimulus giving the impression to the user of touching a surface having a relief.

18. Process for manufacturing a piezoelectric ceramic actuator of an interface as defined in claim 1, comprising the steps of:
depositing at least a first layer of a conductive material on the upper face of a flexible carrier,
fastening a piezoelectric ceramic to the conductive layer thus formed,
depositing a layer of a conductive material on the piezoelectric ceramic,
depositing a layer of an electrical insulator on the layers deposited beforehand.

19. Process for manufacturing an interface as defined in claim 1, comprising the step of:
joining two flexible walls so as to form a chamber, at least one of the walls having actuators on one of its faces.

* * * * *